United States Patent [19]
Fox

[11] Patent Number: 5,208,718
[45] Date of Patent: May 4, 1993

[54] PROTECTION CIRCUIT

[75] Inventor: Ronald C. S. Fox, Randwick, Australia

[73] Assignee: Alcatel N.V., Amsterdam, Netherlands

[21] Appl. No.: 690,937

[22] PCT Filed: Nov. 17, 1989

[86] PCT No.: PCT/AU89/00491
§ 371 Date: Jul. 9, 1991
§ 102(e) Date: Jul. 9, 1991

[87] PCT Pub. No.: WO90/07213
PCT Pub. Date: Jun. 28, 1990

[30] Foreign Application Priority Data
Dec. 12, 1988 [AU] Australia ............... PJ1884

[51] Int. Cl.⁵ ............................................. H02H 9/04
[52] U.S. Cl. ........................................ 361/18; 361/111
[58] Field of Search ............... 361/18, 56, 111, 117

[56] References Cited

U.S. PATENT DOCUMENTS

| | | | |
|---|---|---|---|
| 3,582,713 | 6/1971 | Till | 361/18 |
| 4,530,023 | 7/1985 | Brown | 361/18 |
| 4,531,173 | 7/1985 | Yamada | 361/18 |

Primary Examiner—Todd E. DeBoer
Attorney, Agent, or Firm—Brunell & May

[57] ABSTRACT

A protection circuit for protecting circuit elements (TX) connected to line via terminal means (L1 and L2) from the effects of a transient abnormal high voltage surge, comprising a semiconductor switch (TR1 and TR2), a first circuit comprising a resistor (R1) in series with the conductor path of the semiconductor switch and a voltage reference means (D1, and D2) in parallel with the resistor and a junction of the semiconductor, and a second circuit comprising the first voltage reference means in series with a second voltage reference means (D3), the second circuit being connected in parallel with the resistor. The second circuit further includes a voltage dependent resistance (VC1). When the current through the resistor exceeds normal line current the voltage reference means (D1, D2, D3) clamp the voltage drop across the resistor and turn off the semiconductor switch.

11 Claims, 2 Drawing Sheets

PROTECTION CIRCUIT

TECHNICAL FIELD

The invention relates to a protective circuit arrangement for protecting circuit elements connected to a line against the damaging effects of transient abnormal high voltage surges on the line caused by, for example, lightning or fluctuations in adjacent power transmission lines. The circuit arrangement of the present invention is particularly, though not exclusively, suitable for protecting line associated elements of a telephone subset connected to an exchange line via a solid state line switch, the line switch providing a hook-switch function and loop-current interrupt functions.

Protection circuits for telephone subsets of the aforementioned kind are known and comprises a voltage limiting circuit and a current limiting circuit. The voltage limiting circuit comprises a voltage dependent nonlinear resistor connected across the subset's line terminals to substantially absorb transient high voltage surges on the line, thus protecting circuit elements in the subset that are associated with the line terminal end of the subset's circuit. In addition to the voltage limiting circuit, a current limiting circuit is also provided. The current limiting circuit comprises an arrangement of a resistor in series with and on the line side of the conductive path of the line switch, and a diode arrangement connected between the line end of the resistor and the line switch's control element. The value of the resistor is chosen so that when a current threshold is exceeded, the voltage drop across the resistor exceeds the forward drop across the diode arrangement thus limiting the current through the conductive path of the line switch.

A disadvantage of the known protection circuit is that a proportion of the current produced by the transient voltage surge passes through the line switch and therefore the line switch's power rating must be sufficient to accommodate this transient current and the power rating chosen accordingly. This is reflected in the cost of the transistors used in the line switch.

It is therefore an object of the present invention to provide an improved protection circuit for protecting electrical equipment connected to a line via a solid state switch from the damaging effects of the transient abnormal voltage surges on the line, and thereby permitting the power rating of the transistors used in the line switch to be lowered.

SUMMARY OF THE INVENTION

According to a first aspect of the present invention there is provided a protection circuit for protecting circuit elements connected to a line via line terminal means from the effects of a transient abnormal high voltage surge, said circuit comprising a controllable semiconductor switch having a conductive path is serially connected between said line terminal means and said circuit elements for selectively connecting said circuit elements to said line, said protection circuit comprising a first circuit comprising a first resistance means of a predetermined value connected in series between one terminal of the line terminal means and the conductive path of the said semiconductor switch, and a first voltage reference means connected in parallel with said first resistance means and the junction of the said semiconductor's conductive path its control element, and a second circuit comprising the first voltage reference means in series with a second voltage reference means, said second circuit being connected in parallel with said first resistance means, said second circuit further including a voltage dependent second resistance means having a predetermined threshold value connected between the junction of the first and resistance means and the conductive path of the said semiconductor switch and another terminal of said line terminal means, the resistance value of said first resistance means being chosen so that with a normal magnitude of line current the sum of the voltage drops across the first resistance means and the said junction of the semiconductor's conductive path and its control element is less than the reference voltage of the first reference means, and when the magnitude of the line current exceeds the normal magnitude, the said sum of the voltage drops increases accordingly until it reaches the reference voltage of the first reference voltage means whereupon said reference voltage means clamps the voltage across said first resistance means and thereby limits the current therethrough, and upon said voltage dependent second resistance means detecting its threshold voltage it permits current to increase through said first resistance means until the voltage drop thereon equals the sum of the reference voltages of the first and second reference voltage means whereupon the voltage across said first resistor means is clamped thereby and the semiconductor switch means rendered nonconducting by the reference voltage of said second voltage reference means.

According to a further aspect of the present invention there is provided a protection circuit wherein said first voltage reference means comprises two serially connected semiconductor diodes.

BRIEF DESCRIPTION OF DRAWINGS

In order that the invention may be carried into effect, embodiments thereof will now be described in relation to the drawings, in which.

BEST MODE OF CARRYING OUT THE INVENTION

Figure 1:
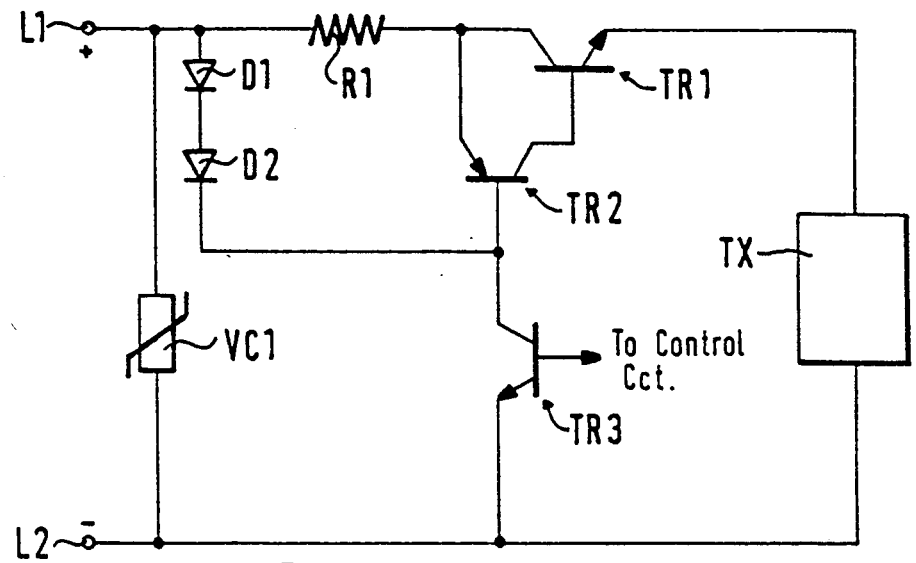
FIG. 1 shows part of the line circuit of a telephone subset incorporating a known protection circuit.

Referring to FIG. 1, the circuit comprises line terminals L1 and L2 for connection to an exchange line (not shown). Across terminals L1 and L2 is connected a voltage protection varistor VC1. A line switch in the form of a complementary pair of transistors comprising an NPN transistors TR1 and a PNP transistor TR2 is serially connected between the line terminals and the subset's transmission circuit TX. The collector/emitter junction of a line switch control transistor TR3 is connected between the base element of transistor TR2 and terminal L2. A resistor R2 is connected between the base of transistor TR2 and the collector element of transistor TR3 to provide a small but sufficient base current for transistors TR2. The base element of transistor TR3 is coupled to an output of a micro-processor (not shown) in the transmission circuit. Signals at this output control the functions of the line switch in a known manner. A resistor R1 is serially connected between terminal L1 and the collector/emitter junction of transistor TR1, and a serial arrangement of two diodes D1 and D2 are connected between terminal L1 and the base element of transistor TR2. Resistor R1 and diodes D1 and D2 form the current limiting section of the protection circuit. The operation of this known current protector circuit has been described above.

Figure 2:
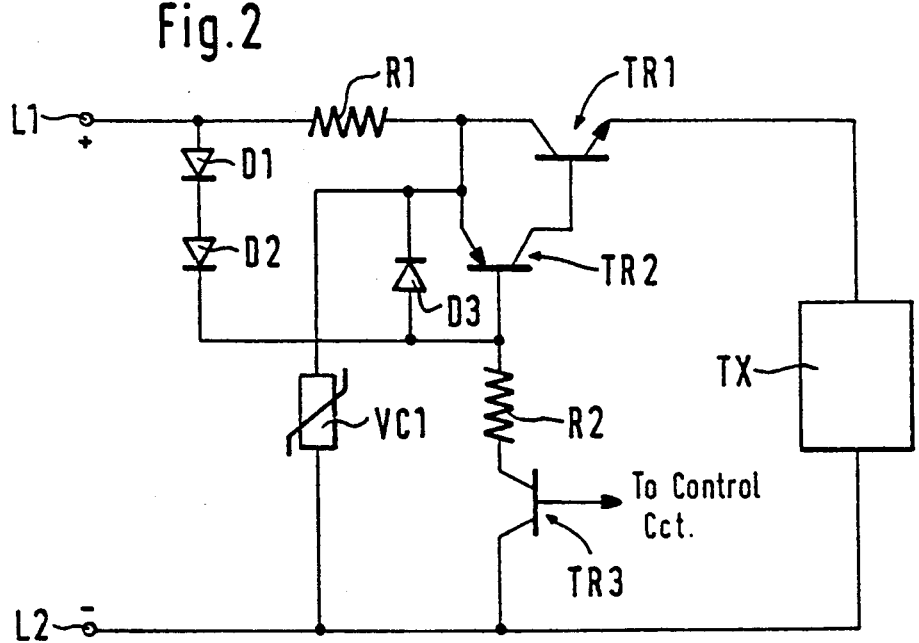
FIG. 2 shows part of the line circuit of a telephone subset incorporating the protection circuit of the present invention.

Referring to FIG. 2, except for the protection circuit, the circuit is identical to that of FIG. 1 and will not be described. The protection circuit shown in FIG. 2 comprises resistor R1 serially connected between line terminals L1 and the collector/emitter junction of transistor TR1; diodes D1 and D2 serially connected between terminal L1 and the base element of transistor TR2; a varistor VC1 connected between the junction of resistor R1 and the emitter of transistor TR2, and terminal L2; and a further diode D3 connected across the emitter and base of transistor TR2. The resistance value of resistor R1 is chosen so that the voltage drop across it at normal operating line current ($\leq 150$ ma) is less than the forward bias voltage of diode D1. Typically, the resistance of resistor R1 is approximately 3 ohms.

In operation, with normal line current flowing through resistor R1 and the saturated line switch, the forward bias voltage across the base/emitter junction of transistor TR2 is 0.6 volts and the voltage drop across resistor R1 is less than 0.6 volts. Therefore the voltage drop across diodes D1 and D2 is the sum of the forward bias voltage across the base/emitter junction of transistor TR2 and the voltage drop across resistor R1, which when normal line current is flowing is less than the sum of the forward bias voltages of diodes D1 and D2 (1.2 volts).

In the event of a high voltage surge on the line, the line current begins to increase causing the voltage drop across resistor R1 to increase accordingly; the voltage across the base/emitter junction of transistor TR2, of course, does not change. When the sum of the voltage drops across resistor R1 and the base/emitter junction exceeds the sum of the forward bias voltages of diodes D1 and D2, the latter become forward biased. The forwardly biased diodes clamp the voltage across resistor R1 and the base/emitter junction of transistor TR2 and hence prevent an increase in base drive current to transistor TR2, thereby limiting the current through transistor TR1.

At the same time the voltage across varistor VC1 is rising and upon reaching the operating value of varistor VC1, typically 180–250 volts, current through resistor R1 increases until the sum of the voltage drops across resistor R1 and base/emitter junction of transistor TR2 exceeds the sum of the forward bias voltages of diodes D1, D2 and D3. A current path is now established from line terminal L1, diodes D1, D2, D3, varistor VC1 to line terminal L2. The forward bias voltage of diode D3 reverse bias' transistor TR2 which turns off, thereby turning off transistor TR1 and pre-venting virtually any current from flowing through the line switch during the remainder of the voltage surge.

Preferably, a polarity guard circuit (not shown) is interposed between the line terminals and the line switch to ensure that the polarity of the surge voltage is correctly presented to the diodes of the protection circuit.

Figure 3:
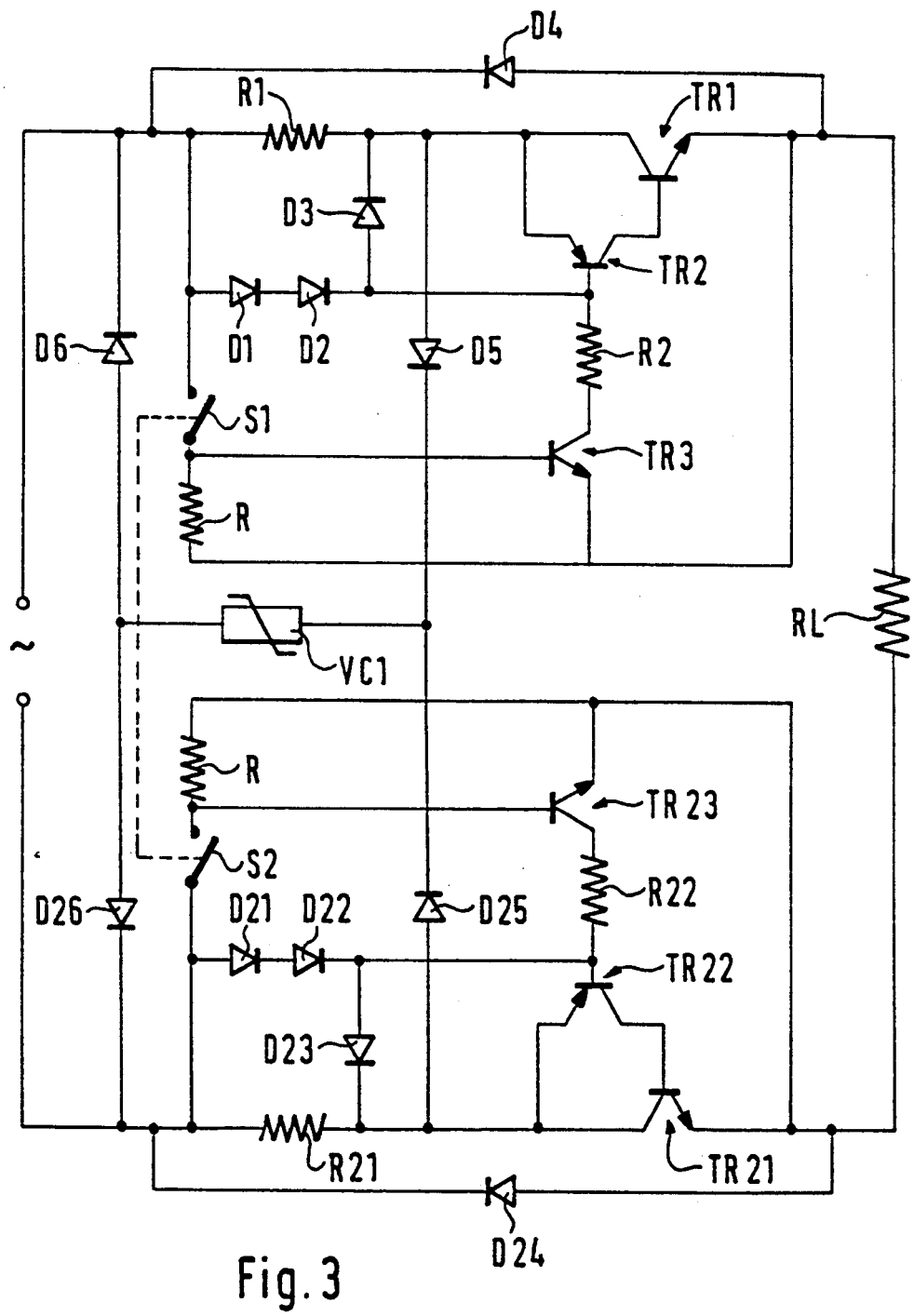
FIG. 3 shows a circuit of an AC power switching arrangement incorporating the protection circuit of the present invention.

Referring to FIG. 3, the AC power switching circuit comprises an AC input ($\sim$) coupled to a load RL via a pair of solid state switching circuits each incorporating the protection circuit according to the present invention to provide full-wave protection in the event of an abnormal power surge on a line (not shown) connected to the input. Varistor VC1 is common to both protection circuits. Switch contacts S1 and S2 when activated switch transistors TR3 and TR23 which in turn switch on the line switch transistors TR1, TR2 and TR21, TR22.

In operation, during the first half cycle the current path for normal line current is via resistor R1, collector/emitter junction or transistor TR1, load RL, diode D24 to line. The elements of the protection circuit have the same reference labels as in FIG. 2. If a voltage surge occurs it will cause varistor VC1 to conduct and the resulting forward bias voltage of diode D3 will reverse bias transistor TR2 which will turn off and hence turn off transistor TR1 preventing current from flowing into the load.

During the second half cycle the current path for normal line current is resistor R21, collector/emitter junction of transistor TR21, load RL, diode D4, to line. When the voltage across varistor VC1 exceeds its threshold and begins to conduct, the resulting forward bias voltage of diode D23 will reverse bias transistor TR22 which will turn off and turn off transistor TR21. Diodes D5, D6, D25 and D26 divert the surge current away from the load RL.

While the present invention has been described with regard to many particulars it is understood that equivalents may be readily substituted without departing from the scope of the invention.

INDUSTRIAL APPLICABILITY

The above described invention may be advantageously applied in the manufacture of telephone subset apparatus.

I claim:

1. A protection circuit for protecting circuit elements connected to a line via line terminal means from the effects of a transient abnormal high voltage surge, said circuit comprising
   a controllable semiconductor switch having a conductive path serially connected between said line terminal means and said circuit elements and responsive to an associated control element for selectively connecting said circuit elements to said line,
   a connection between said conductive path and said control element defining a semiconductor junction,
   a first circuit further comprising
      first resistance means of a predetermined value connecting one terminal of the line terminal means with the conductive path of the semiconductor switch and connected in series with said semiconductor junction, and
      first voltage reference means connected in parallel with said first resistance means and said semiconductor junction, and
   a second circuit comprising
      the first voltage reference means,
      second voltage reference means in series with said first voltage reference means, said first and second voltage reference means being connected in parallel with said first resistance means, and
      voltage dependent second resistance means having a predetermined threshold value and connected between the conductive path and another terminal of said line terminal means, wherein the resistance value of said first resistance means is such that with a magnitude of line current within a predetermined normal range, the sum of the voltage drops across the first resistance means and said semiconductor junction is less than the reference voltage of the first reference means, and as the magnitude of the line current exceeds said predetermined normal range, said sum increases until it reaches the reference voltage of the first reference voltage means whereupon said first reference voltage means clamps the voltage across said first resistance means and thereby limits the current therethrough, and upon said voltage dependent second resistance means detecting its threshold voltage in response to said transient abnormal high voltage surge across said terminal means, said second resistance means permits said current to further increase through said first resistance means until the voltage drop across said first resistance means equals the sum of the reference voltages of the first and second reference voltage means whereupon the voltage across said first resistance means is clamped and the semiconductor switch means is rendered nonconducting by the second voltage reference means.

2. A protection circuit as claimed in claim 1, wherein said first voltage reference means comprises two serially connected semiconductor diodes.

3. A protection circuit as claimed in claim 2, wherein said second voltage reference means comprises a semiconductor diode.

4. A protection circuit as claimed in claim 1, wherein said voltage dependent second resistance means comprises a varistor.

5. A protection circuit as claimed in claim 1, wherein said controllable semiconductor switch comprises at least one bipolar transistor whose collector/emitter junction forms the said conductive path and whose base element is coupled to control means.

6. A protection circuit as claimed in claim 5, wherein said base element is coupled to a conductive path of a further transistor whose base element is coupled to said control means.

7. A protection circuit as claimed in claim 5, wherein said semiconductor switch comprises a complementary configuration of an NPN and a PNP transistor, the collector/emitter junction of the NPN transistor forming said conductive path, the base/emitter junction of said PNP transistor forming said semiconductor junction.

8. A protection circuit as claimed in claim 7, wherein said semiconductor switch is a high voltage bipolar device.

9. A protection circuit as claimed in claim 1, wherein
    said protection circuit further comprises a polarity guard device having a constant polarity output and an AC input, and
    said line terminal means is operatively connected across said constant polarity DC output means and said AC input is connected to said line.

10. A protection circuit as claimed in claim 1, wherein said controllable semiconductor switch is a telephone subset line switch whose control element is coupled to control means associated with a telephone subset circuit for controllably switching a loop current circuit of said subset circuit.

11. An AC power switch arrangement for connecting an AC power line to a load, said arrangement comprising
    line terminal means further comprising first and second line terminals,
    load terminal means further comprising first and second line terminals,
    a protection circuit as claimed in claim 1 with its respective said first resistor means and the conductive path of its respective said semiconductor switch coupling said first line terminal to said first load terminal, and
    a second protection circuit as claimed in claim 1 with its respective said first resistor means and the conductive path of its respective said semiconductor switch coupling said second line terminal to said second load terminal.

* * * * *